United States Patent [19]

Adamson

[11] Patent Number: 4,825,648
[45] Date of Patent: May 2, 1989

[54] TURBOFAN ENGINE HAVING A SPLIT COWL

[75] Inventor: Arthur P. Adamson, Cincinnati, Ohio

[73] Assignee: General Electric Company, Cincinnati, Ohio

[21] Appl. No.: 20,280

[22] Filed: Mar. 2, 1987

[51] Int. Cl.⁴ .............................................. F02K 3/02
[52] U.S. Cl. ................................. 60/226.1; 60/39.31
[58] Field of Search ................... 60/226.1, 39.31, 262; 244/54; 248/554, 555

[56] References Cited

U.S. PATENT DOCUMENTS

| | | | |
|---|---|---|---|
| 2,863,620 | 12/1958 | Vautier | 244/15 |
| 2,879,959 | 3/1959 | Morrison et al. | 244/129 |
| 3,541,794 | 11/1970 | Johnston et al. | 60/39.31 |
| 4,037,809 | 7/1977 | Legrand | 244/54 |
| 4,043,522 | 8/1977 | Vetter | 244/54 |
| 4,044,973 | 8/1977 | Moorehead | 244/54 |
| 4,055,041 | 10/1977 | Adamson et al. | 60/226.1 |
| 4,585,189 | 4/1986 | Buxton | 244/54 |
| 4,683,717 | 8/1987 | Naud | 60/226.1 |

FOREIGN PATENT DOCUMENTS

| | | |
|---|---|---|
| 147848 | 12/1984 | European Pat. Off. . |
| 148809 | 1/1985 | European Pat. Off. . |
| 1318748 | 3/1973 | United Kingdom . |
| 1520759 | 8/1978 | United Kingdom . |

Primary Examiner—Donald E. Stout
Attorney, Agent, or Firm—Derek P. Lawrence; Nathan D. Herkamp

[57] ABSTRACT

A turbofan engine having a power generating portion of the engine supporting a fan and surrounded by a cowl. The cowl is split with the two sections being arcuate and hinged so that they can pivotally open for access and removability of the power generating portion of the engine. The split cowl is supported directly from a support pylon whereby there is no fan frame required.

12 Claims, 4 Drawing Sheets

TURBOFAN ENGINE HAVING A SPLIT COWL

BACKGROUND OF THE INVENTION

This invention relates to gas turbine engines, and more particularly to a ducted turbofan engine having the bulky, static portions of the engine directly supported from an aircraft, and the power generating portion of the engine capable of being removable from the rest of the engine.

Engines are expensive and difficult to service and install in aircraft. Part of the high maintenance costs on the engines is the fact that it is necessary to remove the entire engine from the aircraft for servicing. This is of special significance in a ducted turbofan engine where the diameter of the fans may be as much as 12-14 feet and the weight of the frame and outer fan cowl becomes quite substantial. The cost and difficulty of the removal of such large and bulky engines is often great.

In a ducted turbofan engine, the engine itself is supported by the aircraft pylon. A large fan frame mounts the fan cowl to the engine. Typically, the fan inlet, the aft fan duct, and often the thrust reverser, are all integrated with the cowl and result in a bulky, expensive, and exceedingly large part of the engine which is supported by the power generating portion of the engine through the frame. Likewise, the fan stator vanes are also supported by the power generating portion of the engine and also add considerable bulk. These parts normally require infrequent servicing and such servicing can be done right on the aircraft.

In servicing the power generating portion of the engine, the entire engine must be removed from the aircraft including the fan cowl, the fan frame, the stator vanes, and all other parts supported by the core engine. The items requiring off engine servicing are normally the internal parts of the power generating portion.

It has been known to split the nacelle and thrust reverser which is directly around the power generating portion of the engine. However, this is typically a lightweight sheet metal covering which easily splits to expose the machinery and equipment of the power generating portion of the engine. On the other hand, the static engine parts such as the fan cowl, fan stator, inlet, aft fan duct, and other parts, are all integrated with and supported by the power generating portion of the engine through the structural fan frames and are never split and are therefore removed with the power generating portion of the engine.

As ducted turbofan engines continue to get larger to provide increased thrust, the need to reduce the cost, time and effort for removing the entire engine for servicing, transport, and maintenance, increases.

SUMMARY OF THE INVENTION

It is accordingly an object of the present invention to provide a turbofan engine where the bulky engine parts remain with the aircraft and the power generating portion of the engine with the fan blades is removable for low cost, lightweight, maintenance and installation, while the large diameter engine parts, except for the fan blades, remain on the aircraft.

Another object of the present invention is to provide a turbofan engine whose bulky components can be split to permit removal of the power generating portion of the engine as a package.

Yet a further object of the present invention is to provide a turbofan engine where the heavy, engine parts are integrated with the nacelle to remain with aircraft while permitting removability of the power generating portion of the engine therefrom.

A further object of the present invention is to provide a turbofan engine having a split fan cowl, fan stator, and aft fan duct all of which are directly supported by the aircraft pylon, permitting removability of the power generating portion of the engine and the fan blades.

Another object of the present invention is to provide a turbofan engine where the fan cowl, fan stator, and other parts are directly supported by the aircraft pylon thereby avoiding the need for a fan frame structure.

Yet another object of the present invention is to provide a turbofan engine where the bulky engine components are supported directly from the aircraft and include the fan cowl, the fan stator, and the containment shroud or nacelle, all of which are split and can open to permit easy access and removability of the power generating portion of the engine and the fan blades as a unitary package.

Briefly, in accordance with the present invention, there is provided a turbofan engine which includes a power generating portion of the engine with a fan operatively supported thereon. The power generating portion of the engine with the fan are supported from the aircraft. A split fan cowl is provided which includes opposing arcuate cowl sections. These cowl sections are hinged to permit pivotal separation of the cowl sections in order to access the power generating portion of the engine and fan for servicing. Closure mechanisms are provided on the split cowl for securely coupling the arcuate cowl sections together in order to define a fan duct around the fan and the power generating portion of the engine. A mounting arrangement supports the split cowl directly from a support pylon.

In an embodiment of the invention, a containment shroud or nacelle surrounds the power generating portion of the engine. The nacelle can also be formed of two arcuate nacelle sections which are respectively coupled to the two arcuate fan cowl sections, so that as the fan cowl splits the nacelle splits along with it.

Additionally, a mixer can be included and the mixer can likewise be formed of opposing sections so that the mixer will also split together with the fan cowl. A core nozzle can likewise be split so that it will also split with the split cowl.

The inlet can either be integrated with the fan cowl so that it will also split, or it can be made as a single circular unit which remains as one piece and the cowl will couple to it in the closed position of the engine.

The aforementioned objects, features and advantages of the invention will, in part, be pointed out with particularity and will, in part, become obvious from the following more detailed description of the invention, taken in conjunction with the accompanying drawing, which forms an integral part thereof.

BRIEF DESCRIPTION OF THE DRAWINGS

In the drawings.

In the various figures of the drawing, like reference characters designate like parts.

DETAILED DESCRIPTION OF THE INVENTION

Figure 1:
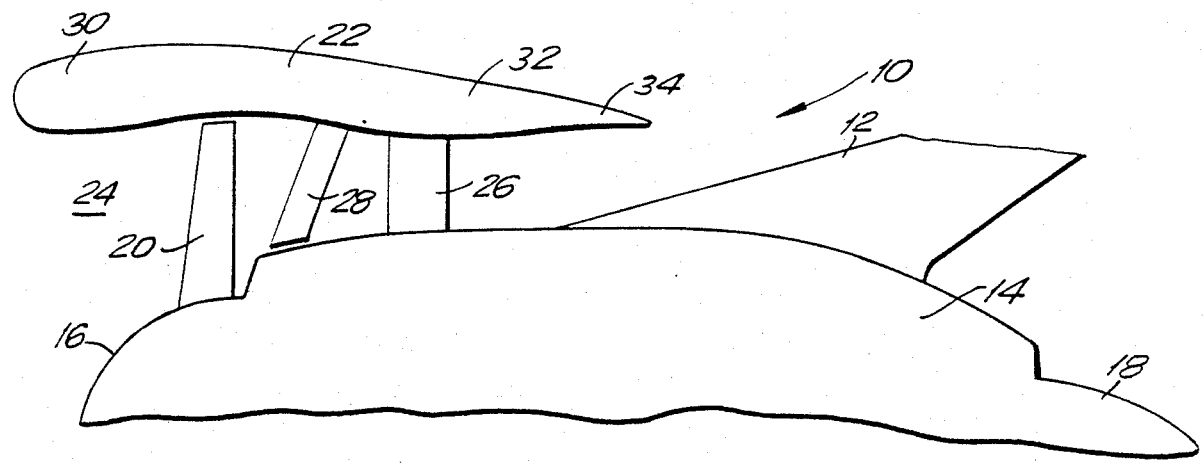
FIG. 1 is a schematic drawing showing a part of a conventional engine arrangement for a turbofan engine.
Figure 2:
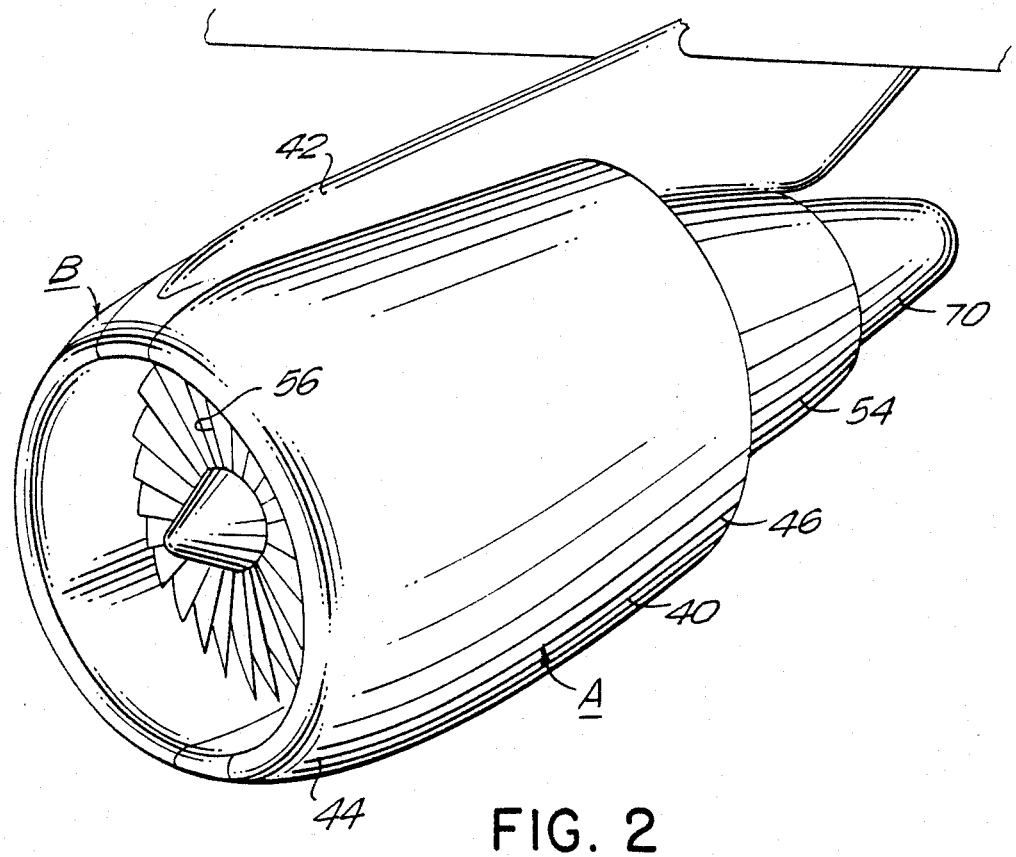
FIG. 2 is a perspective view of a turbofan engine in accordance with the present invention.
Figure 3:
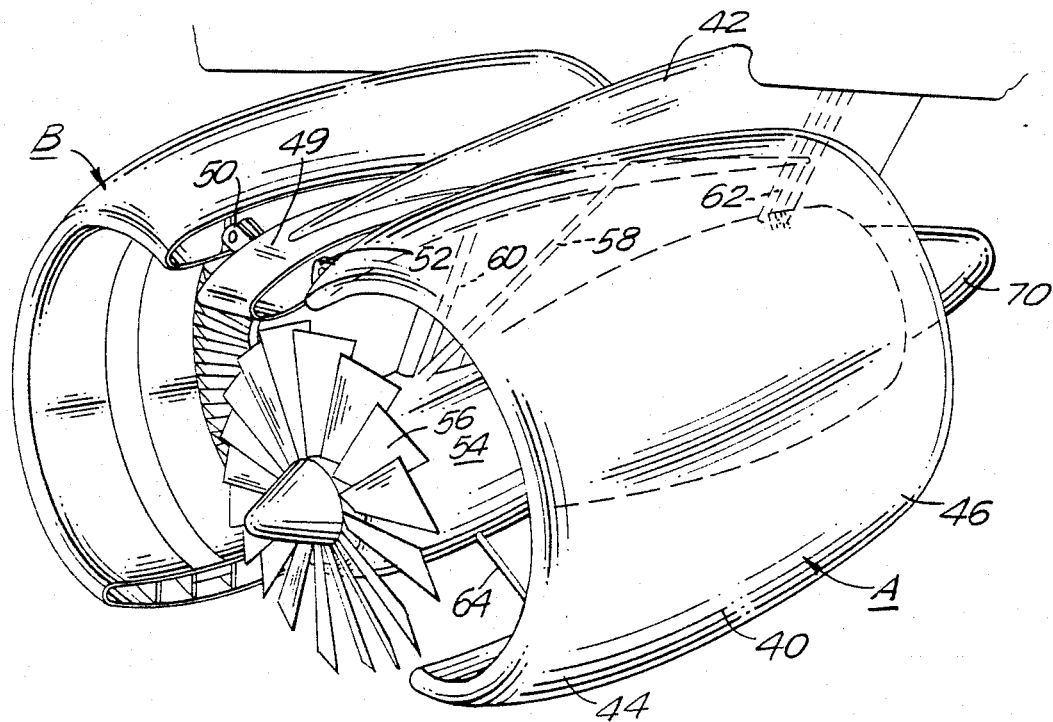
FIG. 3 is a perspective view of the engine shown in FIG. 2 with the split cowl partially opened.
Figure 4:
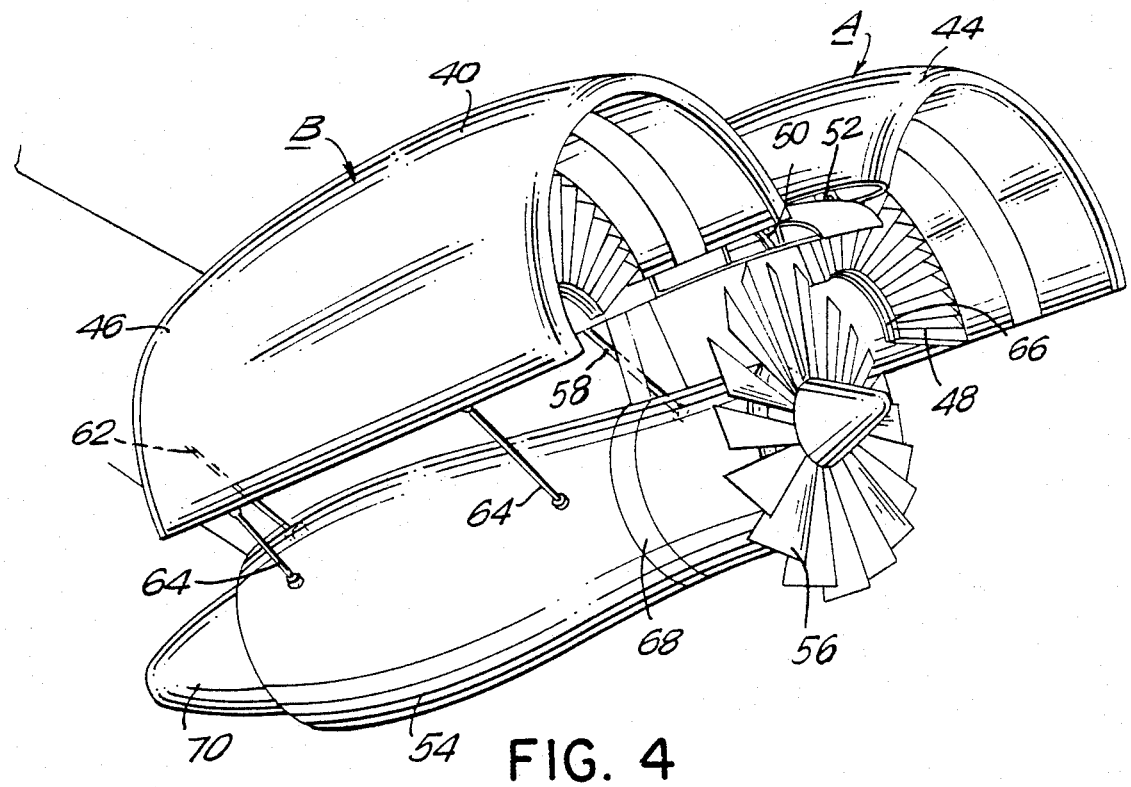
FIG. 4 is a perspective view of the engine shown in FIG. 2 with the split cowl being completely opened to expose the power generating portion of the engine as a package for servicing.

FIG. 1 shows a conventional, turbofan engine, 10. The engine is supported by a pylon 12 extending from the aircraft. The pylon 12 reaches down through the outer shroud or nacelle 14 covering the engine and directly supports the power generating portion of the engine. Within the power generating portion of the engine would typically be included the compressors, a combustor and stages of turbines. These are typically covered by a thin layered nacelle 14 having an inlet 16 at the front and a core nozzle 18 aft of the engine. The rotor vanes 20 of the fan would be supported by the power generating portion of the engine.

In the ducted turbofan engine, there is also included a large, bulky fan cowl 22 defining a duct 24 for the fan elements. The fan cowl 22 would be supported by a large fan frame 26 having a plurality of vanes extending peripherally around the power generating portion of the engine. The fan stator vanes 28 would likewise be supported by the fan cowl.

The static part of the engine includes the bulky components such as the fan frame 26, the stator vanes 28, and the fan cowl 22 which can also include other parts such as the inlet 30, the aft fan duct 32 and frequently a thrust reverser 34. An engine gear box and other accessories may also be conventionally mounted as part of the power generating portion of the engine and also serve as part of the static components.

When servicing of the engine is required, the entire engine package is removed from the aircraft by disconnecting it from the pylon 12. As can be seen from FIG. 1, the engine therefore includes extremely bulky components such as the fan frame, the fan cowl, the stator vanes, and other of the static parts, all of which are removed together as one package. The size of this removed engine package is not only large but exceedingly bulky, especially when fans in the neighborhood of 12-14 feet diameter are being utilized. Removal therefore becomes costly and transporting becomes difficult.

Referring now to FIGS. 2–5, the above problems are avoided by mounting the static, bulky components, including the fan cowl 40, directly on the aircraft pylon 42. In the embodiment shown, mounted along with the fan cowl would be the fan inlet 44, the aft fan duct 46, and the fan stator vanes 48. All these parts would be split longitudinally into two sections referred to as section A and section B. At the top end, the two sections are hinged to a center longitudinal arm 49 which is structurally connected to the pylon 42. The two sections A and B are hinged by means of hinges 50, 52 to this central support arm 49.

The portion that remains not split is the power generating portion of the engine 54 including its outer shroud or nacelle and the rotor vane 56 of the front fan. This power generating portion of the engine is supported by means of support struts 58, 60, 62 from the pylon 42. The support struts are such that they permit the power generating portion of the engine 54 and fan blades 56 to be removed from the pylon support.

It will thus become evident that the fan frame function of the prior art turbofan engines disappears and there is no need for the fan frame at all. The power generating portion of the engine and fan blades are directly supported by the pylon and removable therefrom. The static portions including the fan cowl, stator vanes, and other static parts, are also directly supported from the pylone but are split to open up thereby exposing the power generating portion of the engine for maintenance and removability.

In order to provide suitable centering between the power generating portion of the engine and the static elements therearound, removable tension links 64 can be included. These could be of the collapsible type or telescopic type which would fold upon closure of the arcuate elements of the split cowl. Alternately, a centering arrangement could be provided between the inner band 66 of the stator vanes and a corresponding mating portion 68 around the shroud or nacelle 54. In the embodiment shown, the core nozzle 70 is part of the removable portion.

With the embodiment as shown, the removable power generating portion of the engine would consist of a relatively small amount of the total propulsion system. It would be easy to service, require little investment in spare engines, be low cost to produce, be lightweight, and would have few interfaces with the aircraft. The heavy, static components remain with the aircraft.

Appropriate closure latching elements 71, 72 would be provided to be sure that the engine remained adequately closed during operation. Likewise, various sealing elements would be placed along the power generating portion of the engine to appropriately seal the power generating portion of the engine.

Figure 5:
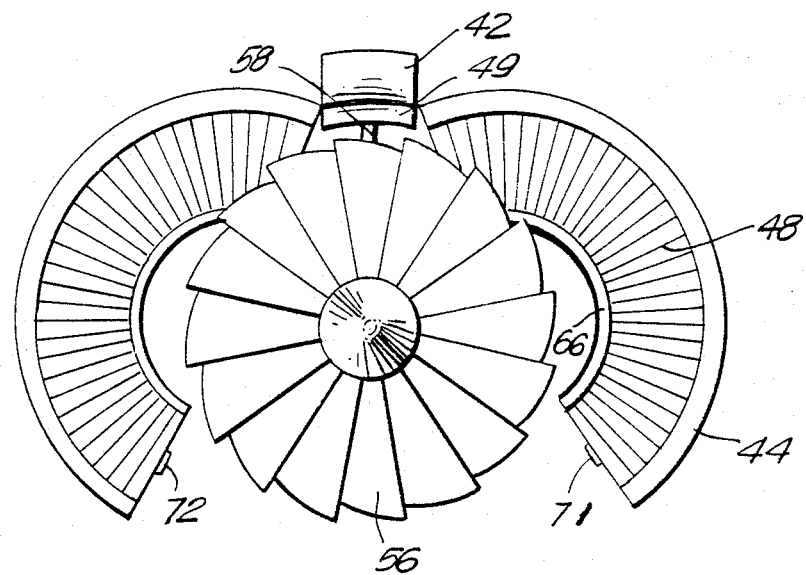
FIG. 5 is a front view of the arrangement shown in FIG. 4.
Figure 6:
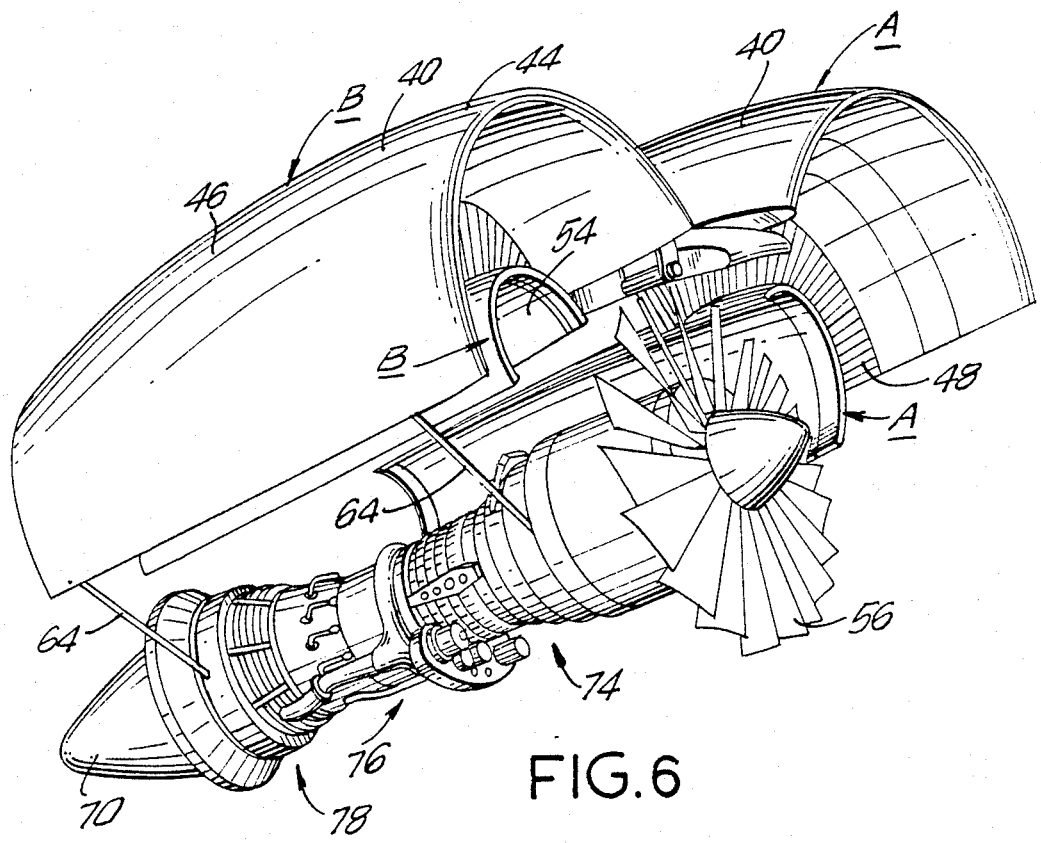
FIG. 6 is a perspective view similar to that shown in FIG. 4, and showing another arrangement where the nacelle is also split along with the split cowl.

FIG. 6 shows a variation where the shroud or nacelle 54 is also split into parts A & B and are respectively connected to the parts A and B of the fan cowl. Other parts of FIG. 5 are identified in a manner identical to that of the previous figures. In this case, the package that is exposed and is removable is only the power generating portion of the engine including the compressor stages 74, the combustor 76, the turbine stages 78, the nozzle 70 and the fan blades 56.

Figure 7:
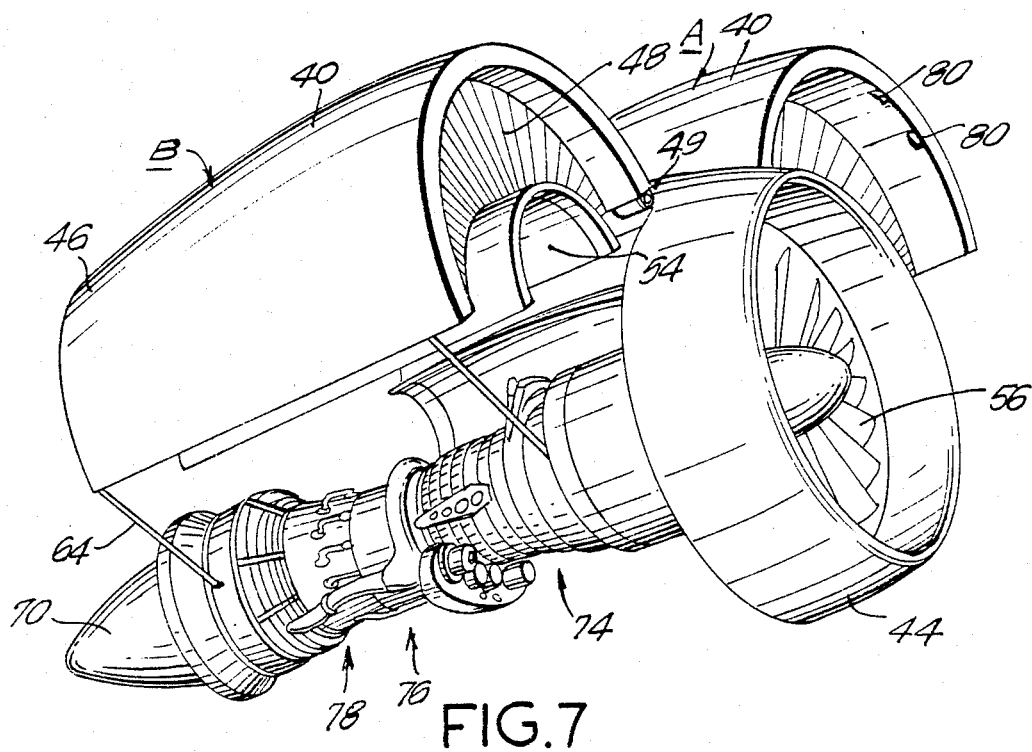
FIG. 7 is a perspective view similar to that shown in FIG. 6 and showing a unitary fan inlet which is not split.

FIG. 7 shows yet a further modification wherein the inlet 44 is unsplit and remains as a single circular unitary member. The split portions A & B of the fan cowl 40 begin aft of the inlet. When unsplit, as shown in FIG. 7, the inlet would be mounted at the top to the central support 49 at the front end of the pylon and would be available for ground servicing only. In flight, the unsplit inlet mounting would be strengthened by closure of the fan cowl on one side of the inlet. Appropriate latching 80 or other type of clamping arrangement would be provided to clamp the split cowl to the inlet.

Figure 8:
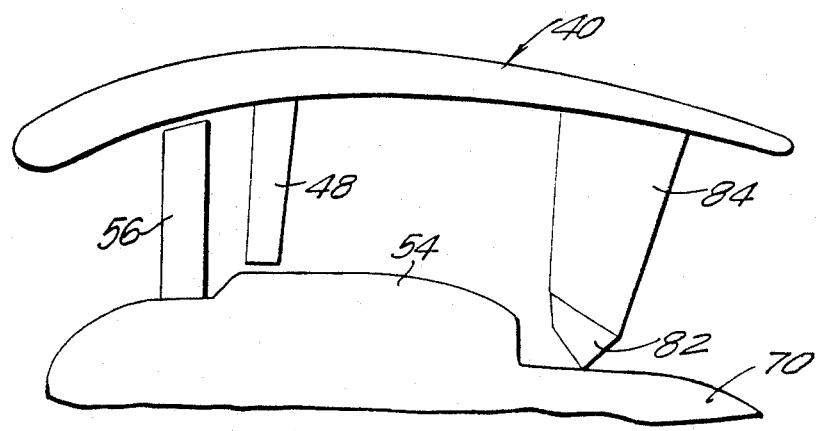
FIG. 8 is a sketch showing an engine outline showing the position of a split mixer and split core nozzle along with the split cowl arrangement.

A further variation is indicated in FIG. 8 where there is schematically shown where a mixer 82 could be interconnected by means of a support 84 to the split cowl 40 and could also be split. Likewise, the nozzle 70 could also be split as part of the split core cowl or as part of the split mixer or as part of the split fan cowl and in this way would stay with the aircraft rather than be removed as part of the removable engine package.

It should be noted, as can best be seen in FIG. 5, that the split cowl is not split into two complete 180 degree segments. Doing so might cause some trouble in closing on the circular fan rotor blades 56. Therefore, there is provided the short top center portion 49 which is mounted directly on the pylon and is not hinged. The hinged portions are therefore somewhat less than the 180 degrees of each section.

There has been disclosed heretofore the best embodiment of the invention presently contemplated. However, it is to be understood that various changes and modification may be made thereto without departing from the spirit of the invention.

I claim:

1. A turbofan engine comprising a power generating portion of the engine, fan means comprising a rotor operatively supported by said power generating portion of the engine, stator vanes, a fan shroud, an aft fan duct and a fan inlet, support means supporting the power generating portion of the engine and the rotor from a support pylon, a split cowl having opposing arcuate cowl section, said split cowl supporting said stator vanes, fan shroud, aft fan duct and fan inlet all of which are split with said arcuate cowl sections, hinge means on said split cowl for permitting pivotal separation of the arcuate cowl sections to access the power generating portion of the engine and rotor for servicing, closure means on said split cowl for securely coupling together the arcuate cowl sections to define a duct around said power generating portion of the engine, mounting means on said split cowl for supporting said split cowl from a support pylon, and wherein said support means comprises means for removing only said power generating portion of the engine together with said rotor from said split cowl.

2. A turbofan engine as in claim 1, and further comprising a containment shroud surrounding said power generating portion of the engine, and wherein said containment shroud is removed with said power generating portion of the engine and fan means.

3. A turbofan engine as in claim 1, and further comprising a containment shroud surrounding said power generating portion of the engine, and wherein said containment shroud is split comprising opposing arcuate shroud sections, said shroud sections being correspondingly coupled to said cowl sections, whereby pivotal separation of the cowl sections also separates the shroud sections.

4. A turbofan engine as in claim 3, and further comprising a split core nozzle having opposing arcuate nozzle sections, said nozzle sections being correspondingly coupled to said arcuate shroud sections, whereby pivotal separation of said cowl sections also separate said shroud sections.

5. A turbofan engine as in claim 1, and further comprising a fan and core mixer formed of opposing arcuate sections, said arcuate mixer sections being coupled to said cowl sections, whereby pivotal separation of said cowl sections also separates said mixer sections.

6. A turbofan engine as in claim 1, and further comprising an unsplit circular fan inlet, and clamping means for clamping the fan inlet to the split cowl when in its closed position.

7. A turbofan engine as in claim 1, wherein said split cowl is an elongated substantially cylindrical member and is split longitudinally.

8. A turbofan engine as in claim 7, wherein said split cowl comprises an elonated top central portion forming a part of said mounting means, wherein said arcuate cowl sections form the remainder of the periphery of said split cowl.

9. A turbofan engine as in claim 1, and further providing a centering support between the power generating portion of the engine and the split cowl.

10. A turbofan engine as in claim 1, wherein said stator vane sections comprise centering support means.

11. A turbofan engine as in claim 3, wherein said support means comprise removable tension links for centering said containment shroud within said split cowl.

12. A turbofan engine as in claim 1, and wherein said cowl is characterized by the absence of a fan frame.

* * * * *